United States Patent [19]

Drower

[11] Patent Number: 5,543,201

[45] Date of Patent: Aug. 6, 1996

[54] METHOD AND APPARATUS FOR PRECISELY POSITIONING AND ATTACHING A PROTECTIVE FILM LAYER TO A FACE OF A CARD

[75] Inventor: Herbert M. Drower, Wilmette, Ill.

[73] Assignee: Transilwrap Company, Inc., Chicago, Ill.

[21] Appl. No.: 315,248

[22] Filed: Sep. 29, 1994

[51] Int. Cl.⁶ .............................. D06N 7/04; B32B 23/02
[52] U.S. Cl. .......................... 428/142; 428/68; 428/138; 428/172; 428/157; 428/192; 428/212
[58] Field of Search .............................. 428/40, 192, 156, 428/142, 45, 46, 68, 81, 137, 138, 157, 122, 212

[56] References Cited

U.S. PATENT DOCUMENTS 3,734,587  5/1973  Karper ..................................... 312/186

*Primary Examiner*—Donald J. Loney
*Attorney, Agent, or Firm*—Dorn, McEachran, Jambor & Keating

[57] ABSTRACT

A method and an apparatus for precisely positioning and attaching a protective film to one or both faces of a plastic card. The film may include a layer of an oriented polyester and a layer of an amorphous polyester. The method includes the steps of removably adhering an elongated film to an elongated strip of paper to form a carrier. A panel is die cut from the film but remains attached to the strip of paper. A ridge is embossed in the carrier around at least a portion of the periphery of the panel. The embossed ridge of the carrier is positioned over the identification card to locate the die cut panel of film against a face of the card. The die cut panel is laminated to the card. The film outside of the panel and the strip of paper are removed from the identification card. The apparatus includes a carrier strip consisting of a paper strip, a layer of adhesive and a protective film. The film is die cut to form a panel and a positioning embossment is form around at least a portion of the periphery of the panel. A modified apparatus includes a pair of adjacent panels separated by a fold line so that a panel may be affixed to each face of a card.

3 Claims, 2 Drawing Sheets

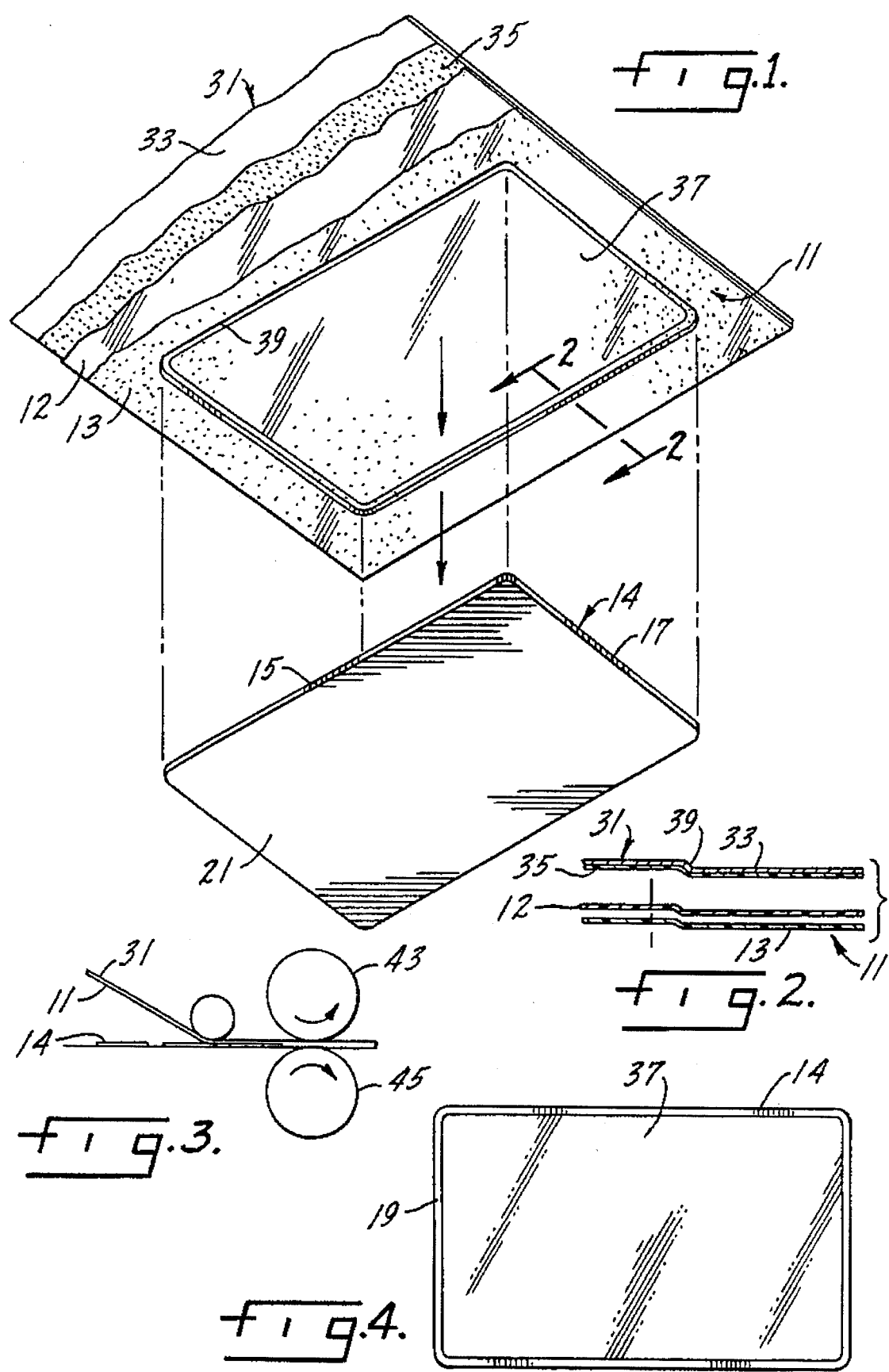

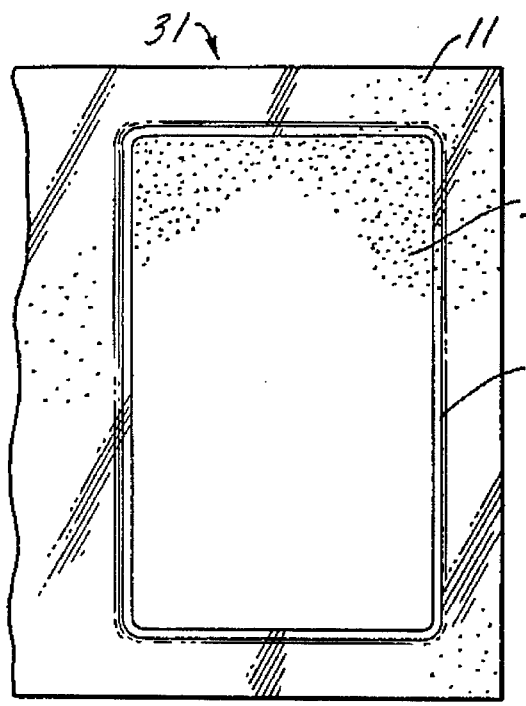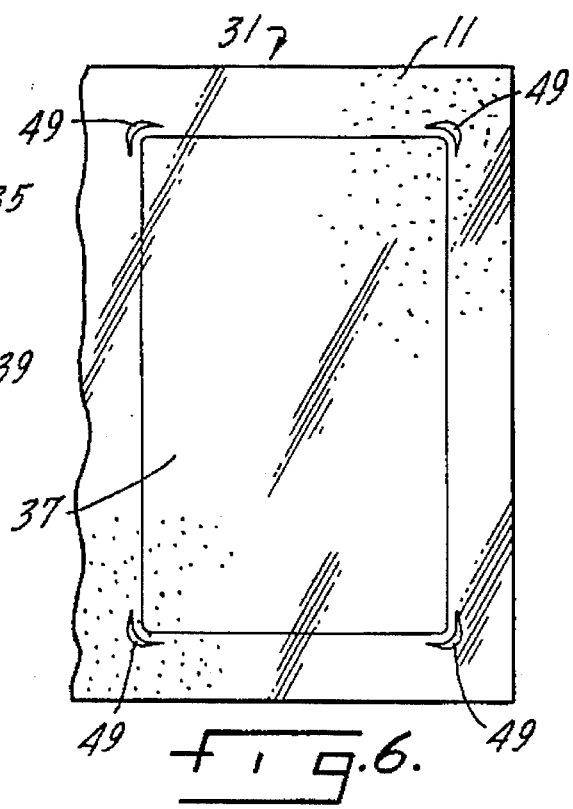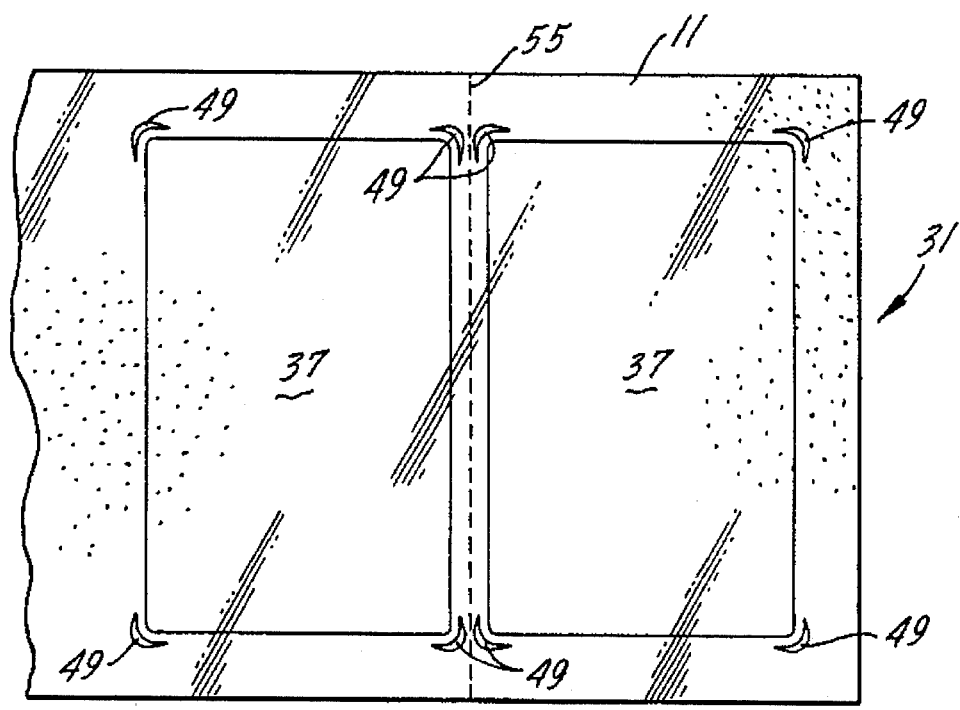

METHOD AND APPARATUS FOR PRECISELY POSITIONING AND ATTACHING A PROTECTIVE FILM LAYER TO A FACE OF A CARD

BACKGROUND AND SUMMARY OF THE INVENTION

Cards issued for identification purposes and for the extension of credit which are used when making purchases include such diverse items as driver's licenses, identification cards, credit cards and the like are conventionally manufactured of laminated layers of plastic. Photographs, photographic images and other identifying data are frequently applied to one or both faces of such cards. It is often desirable to provide a protective film over the identifying data, photograph or photographic image to protect against damage and wear, to add flexural strength to the card and to add resistance to cracking which can be caused by low temperatures. It is also important that the protective film be easily and accurately applied to one or more faces of a card by relatively unskilled labor.

Therefore, an object of this invention is a method of precisely positioning and attaching a protective film layer to one or more faces of a preformed, generally rectangular, plastic card.

Another object of this invention is a carrier strip for applying such a film to one or more faces of a prelaminated plastic card.

Another object of this invention is a precise positioning means to locate the protective film through the use of an embossment formed in a carrier which supports the film.

Another object of this invention is a carrier for a protective film having an embossment which engages the edges of a thick identification type card to precisely position the film relative to the face of the card.

Another object of this invention is a film positioning apparatus which can be easily removed after lamination.

Other objects of the invention will become apparent in the following specification, claims and drawings.

BRIEF DESCRIPTION OF THE DRAWINGS

The invention is illustrated more or less diagrammatically in the following drawings wherein:

FIG. 1 is an exploded perspective view from the underside showing the method of this invention;

FIG. 2 is an exploded, cross sectional view taken along line 2—2 of FIG. 1 and showing an embossing detail;

FIG. 3 is a schematic view of the lamination of the card to the film.

FIG. 4 is a top plan view of a finished card made in accordance with the method of this invention;

FIG. 5 is a top plan view of the paper carrier after the film panel has been removed from the carrier;

FIG. 6 is an alternate form of the invention having modified embossments formed in the carrier sheet; and FIG. 7 is another alternate form of the carrier sheet of this invention.

DESCRIPTION OF THE PREFERRED EMBODIMENTS

FIG. 1 of the drawings schematically represents the method of this invention in which a film 11 of a plastic may be laminated to either one or two faces of a thick, rectangular card 13. A suitable film includes a layer 12 of an oriented polyester and a layer 13 of an amorphous polyester which engages a face of the card 14. As is conventional, the card 14 may be formed of polyvinyl chloride and may be laminated of several layers to provide a card of acceptable thickness. As also is conventional, the card is generally rectangular in shape with rounded corners. A card of this type may be conventionally used for identification purposes such as for drivers' licenses and the like and for credit cards as well as a myriad of other uses. Such a card has longitudinal edges 15 and lateral edges 17 which, in this example, define a front face 19 and an obverse face 21. In many instances, it is desirable to apply the film 11 to the front face 19 of the card 14 to protect photographic images or other identification data which may be applied to the front face 19 of the card. Also, in accordance with the teachings of this invention, the film may also be applied to the obverse face 21 of the card.

In accordance with the teachings of this invention, a carrier 31 is provided to support the film sheet 11 during the positioning and laminating steps. The carrier 31 includes an elongated strip of paper 33 which is lightly held to the film 11 by an adhesive coating 35 which typically may be a pressure sensitive adhesive. A panel 37 is die cut in the film 11 with the dimensions of the panel being slightly smaller in length and width but similar to the front face 19 of the card 14. Simultaneous with the die cutting of the panel 37, a ridge 39 is embossed in the paper and film of the carrier and, in this example, completely surrounds the panel 37. The ridge 39 is dimensioned so that it fits over the longitudinal edges 15 and lateral edges 17 of the card 14 to exactly position the panel over the front face 19 of the card. Because of the adhesive coating 35, both the panel 37 die cut in the film and the remainder of the film 11 as well as the paper 35 are held together until the card and the carrier are run through a laminator which is represented in FIG. 3 of the drawings by rolls 43 and 45. The lamination adheres the amorphous polyester of the film 11 to the face of the card 14. After lamination, the film 11 and the carrier paper 35 are removed leaving the finished card having a panel 37 permanently affixed to the face 19 thereof as shown in FIG. 4 of the drawings. FIG. 5 shows the carrier 31 after removal of the panel 37.

A modification of the invention is shown in FIG. 6 of the drawings where the ridge 39 which is embossed in the carrier 31 is replaced by four ridges 49 each arcuate in shape and located outwardly of a corner of the panel 37. The ridges 49 engage the rounded corners of the card 14 at the longitudinal and lateral edges 15 and 17 to position the panel of film 37 precisely on the face 19 of the card;

FIG. 7 of the drawings shows another modification of the invention in which a pair of panels 37 are die cut in the film 11 adjacent each other. The spacing between the panels is sufficient to allow the carrier 31 to be bent about a line of weakness 55 located between the two panels to fit over a card 14 to permit a panel 37 to be applied to each of the front face and obverse face 21 of a card 14. The corner ridges 49 position both panels relative to their respective faces of the card and hold panels in position through the lamination process.

I claim:

1. A carrier strip for applying a protective film sheet to a face of a prelaminated plastic card, said carrier strip including:

an elongated strip of paper, an elongated protective film sheet adhered to said sheet of paper by an adhesive, at least one panel die cut in said protective film sheet, said die cut panel being similar in shape to but slightly smaller in length and width than said face of said prelaminated plastic card, a ridge embossed in said carrier strip around the periphery of at least a portion of said die cut panel, said ridge encompassing an area having a length and width slightly greater than the corresponding length and width of said plastic card to enable said ridge to surround and position said panel of said protective film in registry with said face of said prelaminated plastic card.

2. The carrier sheet of claim 1 in which said ridge is embossed only around the corners of said panel.

3. The carrier sheet of claim 1 in which a pair of panels are die cut in said protective film sheet adjacent each other, and a line of weakness formed in said carrier strip between said panels so that the carrier sheet may be folded over the edge of a prelaminated plastic card to position a panel of protective film against each face of said card.

* * * * *